Jan. 17, 1950     W. A. BORDEN     2,495,090
AIR COOLING SYSTEM FOR AUTOMOTIVE VEHICLES
Filed Feb. 20, 1948     3 Sheets-Sheet 2
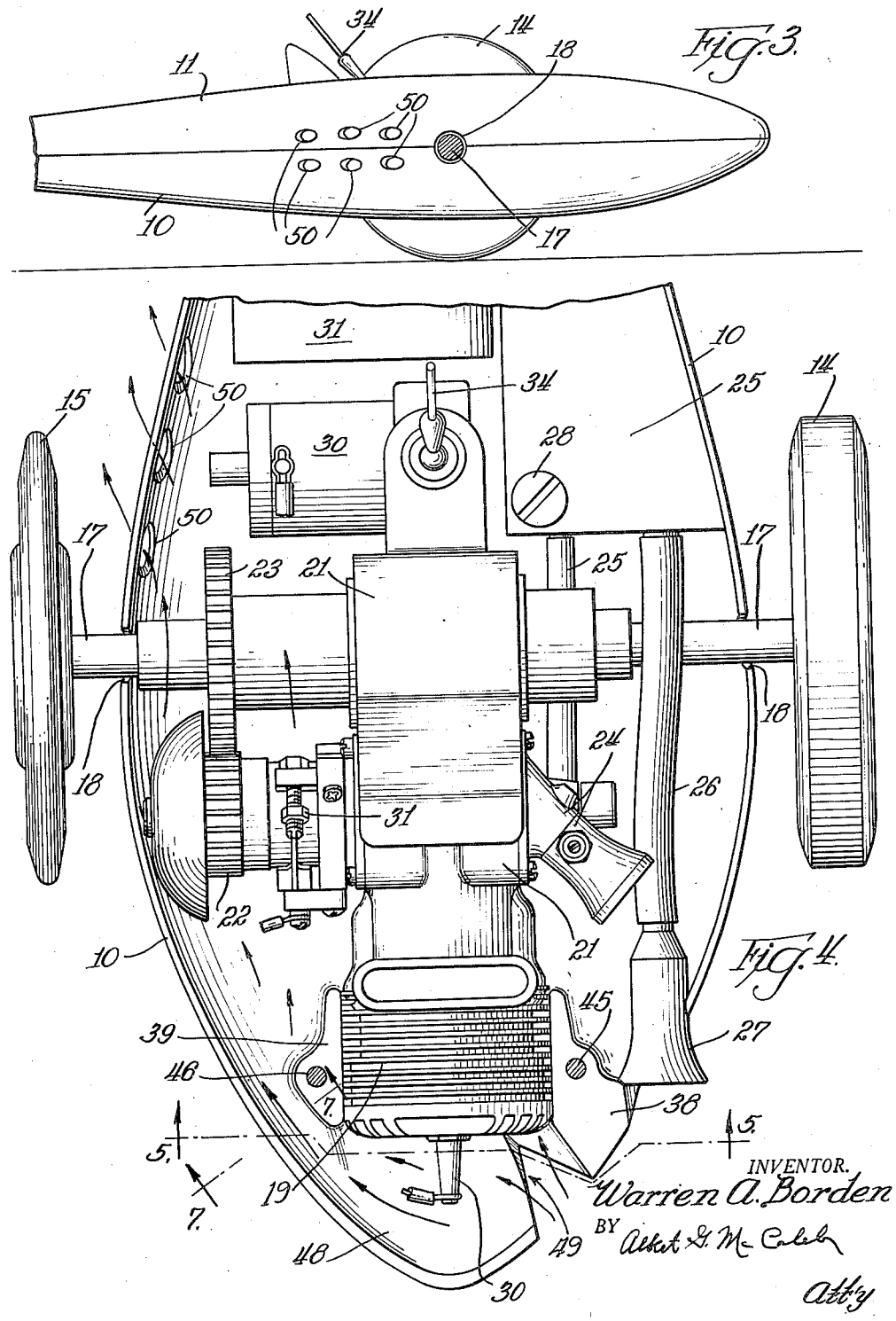
INVENTOR.
Warren A. Borden

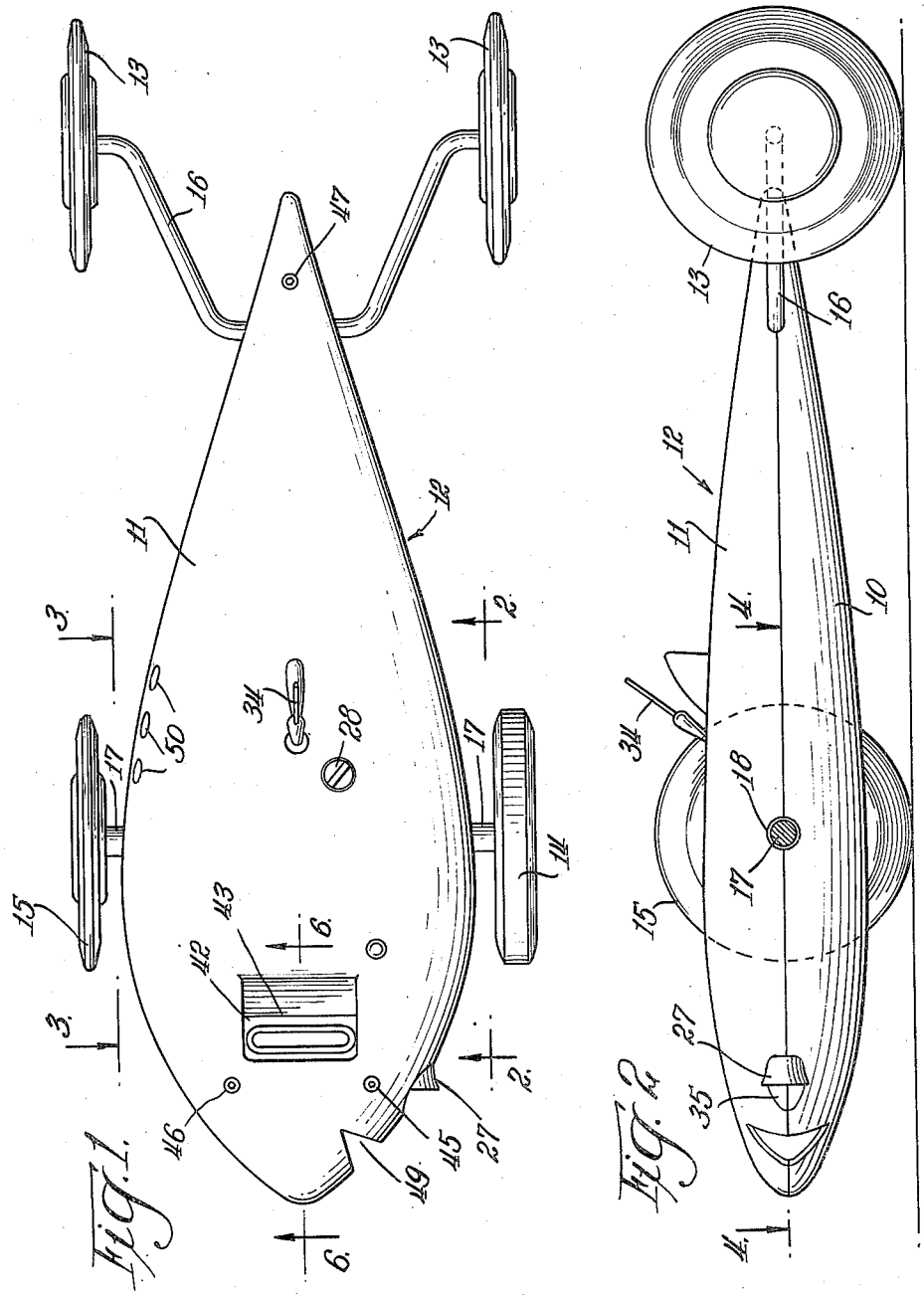

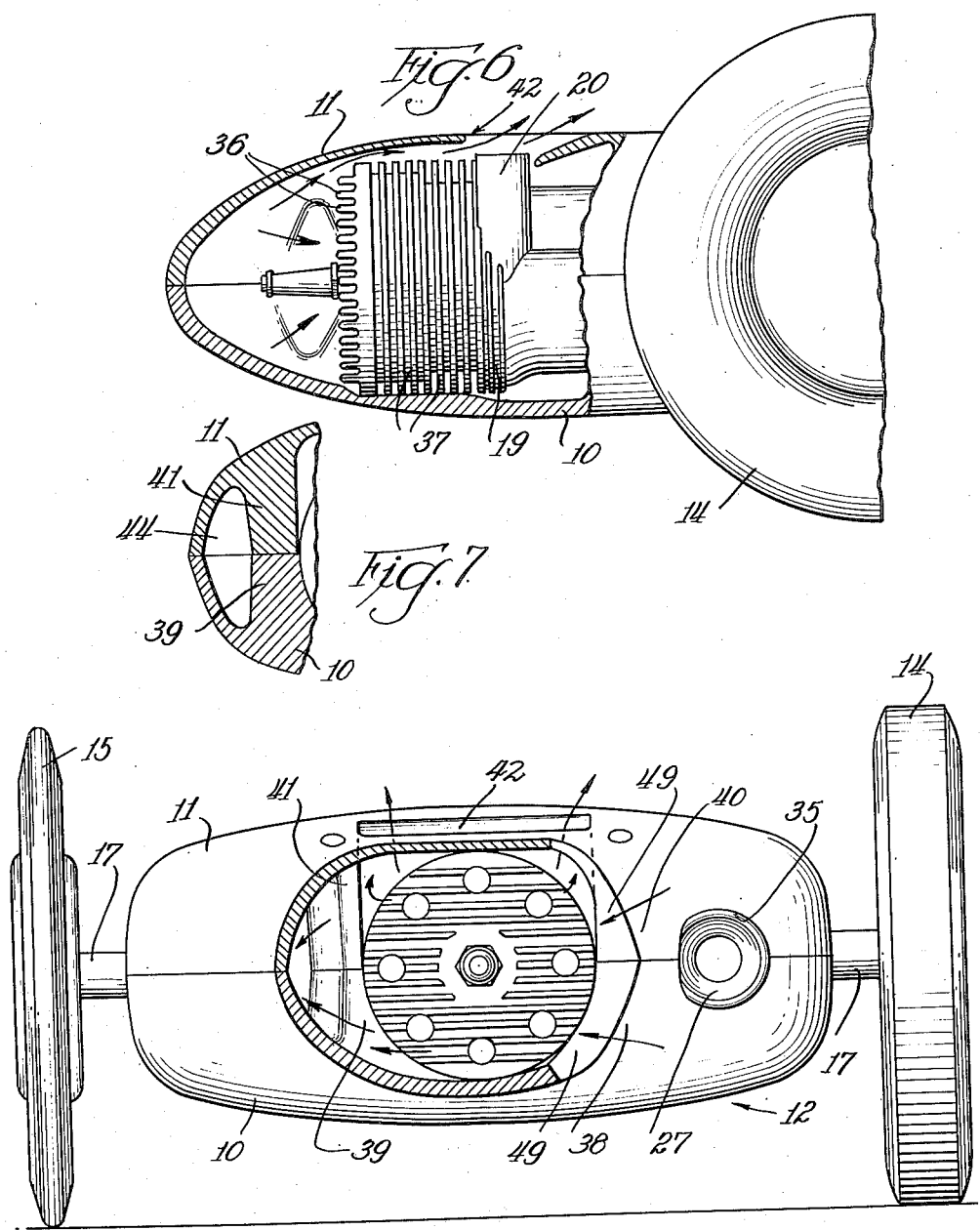

Patented Jan. 17, 1950

2,495,090

UNITED STATES PATENT OFFICE 2,495,090

AIR COOLING SYSTEM FOR AUTOMOTIVE VEHICLES

Warren A. Borden, Zion, Ill.

Application February 20, 1948, Serial No. 9,888

4 Claims. (Cl. 180—54)

My invention relates to air cooling systems for automotive vehicles, and more particularly automotive vehicle model racers and is particularly concerned with air-cooling the internal combustion engines constituting the power plants thereof.

A primary object of my invention is to simplify and improve the air-cooling of an engine cylinder forming part of a model racer power plant or other comparable automotive vehicle power plant.

Another object of my invention is to provide a racer model body or other comparable automotive vehicle body, unique in its structure and in its relationship to an engine cylinder, which insures that such cylinder effectively and sufficiently will be air-cooled when the vehicle is traveling forwardly at high speed.

A salient feature of my invention is a model racer body consisting of but two principal parts so embracing a miniature engine cylinder as to define with it a channel wherein a swift air stream developed by rapid forward travel of the model enters the body interior from a region of high pressure existing exteriorly and immediately in front of the body to impinge upon one lateral portion of the cylinder head and then sweep across such head to pass rearwardly around the other lateral portion thereof in approaching an exit to a region of low pressure existing exteriorly and immediately laterally of the body.

Another noteworthy feature of my invention is the diversion from the swift air stream traced in the immediately preceding paragraph of a branch stream or streams flowing from in front of the cylinder head over the upper portion of the cylinder and aided, in making their exit from the body, by ejector action of the engine exhaust.

The aforementioned and other objects, features, and advantages of my invention will appear from the following detailed description wherein reference is made to the accompanying three sheets of drawings, in which:

Fig. 1 is a top plan view of an automobile model racer embodying my invention;

Fig. 2 is a side view thereof, mostly in elevation, taken in the vertical plane of the line 2—2 of Fig. 1 and looking in the direction indicated by the arrows;

Fig. 3 is a fragmentary side view thereof, mostly in elevation, taken in the vertical plane of the line 3—3 of Fig. 1 and looking in the direction indicated by the arrows;

Fig. 4 is a fragmentary top plan view, taken in the horizontal plane of the line 4—4 of Fig. 2, of the lower half of the model body and its contents as they appear when the upper half of the body is removed;

Fig. 5 is an end view, partly in elevation and partly in vertical section, taken in the planes of the line 5—5 of Fig. 4 and looking in the direction indicated by the arrows;

Fig. 6 is a fragmentary sectional view taken in the vertical plane of the line 6—6 of Fig. 1 and looking in the direction indicated by the arrows; and Fig. 7 is a fragmentary sectional view taken in the vertical plane of the line 7—7 of Fig. 4 and looking the direction indicated by the arrows.

Similar characters of reference refer to similar parts throughout the several views.

A pair of complementary dished metal halves, i. e., a lower half 10 and an upper half 11 abut edgewise to constitute an appropriately streamlined automobile model racer body 12. Body 12 is provided with a pair of trailing rear wheels 13—13 and suitable forward driving wheels 14 and 15. Wheels 13—13 suitably are mounted upon a bent shaft 16 having its intermediate portion extending through the rear portion of the body 12, and wheels 14 and 15 are appropriately related to a shaft 17 which extends transversely of body 12 and emerges with clearance from apertures 18—18 afforded by opposed semi-circular cove recesses presented by the body halves 10 and 11.

Disposed and secured in the lower body half 10 and rising therefrom to lie partially within the lower body half 11 is a miniature internal combustion engine power plant, most of the details of which are not important to the instant invention. It suitably and desirably comprises, inter alia, the following: A single cylinder 19; an upwardly discharging exhaust conduit 20; crank case 21 affording suitable bearings for driving wheel shaft 17 and a crank shaft whereto spur gear 22 is fixed; a cooperating spur gear 23 through which shaft 17 is operatively connected with the crank shaft; charge forming devices 24; a fuel supply system including tank 25, conduit 26 and funnel 27 for maintaining the fuel and tank 25 under pressure, a fuel tank inlet closed by cap 28, and a fuel supply conduit 29 leading from tank 25 to the charge forming devices 24; and a suitable ignition system including spark plug 30, interrupter 31, spark coil 32, battery 33, and a manual control 34 for the ignition system.

The ignition system manual control member 34 suitably projects upwardly from the upper body half 11 and the funnel 27 of the fuel supply system desirably is forwardly exposed through a body opening 35 provided by opposed cove recesses presented by the body halves 10 and 11. The engine cylinder 19 desirably is provided with head-carried cooling fins 36 and radial cooling fins 37.

Having briefly described a typical environment in and with which my present invention suitably may be incorporated, I shall now proceed to describe with more particularity those features of the illustrated model racer structure which are characteristic of my present invention.

Referring more particularly to Figs. 4, 6 and 7, it will be noted that a pair of upwardly projecting cylinder-embracing pillars 38 and 39 are formed integral with and disposed within the dished lower half 10 of the body 12. These pillars 38 and 39 are spaced apart and are spaced rearwardly from the nose portion of the body half 10, and have their opposed lateral faces concavely contoured to lie in immediate proximity to the cylinder 19 and snugly to embrace the cylindrical surface of the cylinder head. Thus, each of pillars 38 and 39 prevents rearward flow of air between it and the engine cylinder 19. Moreover, pillar 38 effectively prevents any flow of air between it and the adjacent side wall portion of body half 10. Pillar 39, however, is spaced from its adjacent side wall portion of the body half 10 to permit rearward flow of air between the two. (See Fig. 4.)

Formed integral with and disposed within the upper body half 11 is a pair of downwardly projecting pillars 40 and 41. The lower end of pillar 40 registers with and preferably contacts aforementioned pillar 38, and the lower end of pillar 41 registers with and preferably contacts aforementioned pillar 39. Pillar 40 prevents rearward flow of air between it and the adjacent portion of the side wall of upper body half 11, but is not contoured to fit the adjacent cylindrical surface of the cylinder head, and therefore permits a certain amount of air to flow rearwardly between it and the cylinder 19 for escape from the body through opening 42 which is formed in the upper body half 11. Such opening 42 is elongated transversely of the body 12 and has its rear margin downwardly deflected at 43 to facilitate the outward movement through it of rearwardly flowing air. Opening 42 registers with the discharge orifice of the engine exhaust conduit 20, and the downwardly deflected trailing edge 43 lies somewhat beneath such orifice. Pillar 41 similarly is not contoured to fit the adjacent cylindrical surfaces of the cylinder head, and therefore permits a certain amount of air to flow rearwardly between it and the engine cylinder 19 for escape through opening 42. However, pillar 41, like pillar 39 with which it registers, is spaced from the adjacent side wall portion of the body half 11 so that the two pillars 39 and 41 cooperate to define a passage 44 of substantial area through which air may flow rearwardly between them and the adjacent side wall of the model body 12. (See Fig. 7.)

The body halves 10 and 11 desirably are secured together by three screws 45, 46 and 47. Screw 45 suitably extends freely through pillar 40 threadedly to engage pillar 38, screw 46 suitably extends freely through pillar 41 threadedly to engage pillar 39, and screw 47 suitably extends freely through the rear extremity of the upper body half 11 to have threaded cooperation with the opposite portion of lower body half 10.

The nose of the model body 12, the head of engine cylinder 19, and the pillars 38, 39, 40 and 41 define a chamber 48 from which a substantial stream of air may flow rearwardly through lateral passage 44, and from which some air may flow over the top of the cylinder to escape through opening 42 in the upper body half 11.

Air is admitted to chamber 48 through an opening 49 in the body nose which is afforded by opposed cove recesses formed in contiguous edge portion of the body halves 10 and 11. Such opening 49 is located on the same side of the medial vertical fore-and-aft plane of the model body as are the pillars 38 and 40, whereas the passage 44 bounded by pillars 39 and 41 is located on the other side of such medial vertical fore-and-aft plane. Also located oppositely from the opening 49, with respect to said plane, is a plurality of cooling air-exhaust openings 50—50 which are formed in the body halves 10 and 11 and are located in the rearwardly tapering portion of the body 12.

When the model racer is traveling rapidly forwardly under the influence of power developed by its engine, a region of high pressure air exists exteriorly of the model nose, and a region of low pressure air exists exteriorly of the body adjacent to its rearwardly tapering portion in which the openings 50—50 are provided. Therefore, air to cool the engine cylinder 19 flows into chamber 48 through opening 49, impinges upon that portion of the cylinder head lying immediately behind opening 49, then sweeps across the cylinder head to find a principal avenue of rearward escape through the passage 44, and then rushes alongside the adjacent side wall of the body 12 to realize lateral escape through openings 50—50 to the exterior region of low pressure air existing adjacent those openings 50—50. At the same time, the ejector effect of the products of combustion exhausted through opening 42 diverts a certain amount of air from the principal stream just traced and causes that diverted air to flow over the top of the engine cylinder and in contact with the fins thereof and then outwardly from the body 12 through such opening 42.

I believe that prior to the advent of my present invention, no automotive vehicle model racer or other automotive vehicle powered with an internal combustion engine was ever equipped with an air-cooling system as simple and at the same time as effective as the one hereinbefore described.

Having thus illustrated and described a presently preferred embodiment of my invention, what I claim as new and desire to secure by Letters Patent of the United States is:

1. An automotive vehicle comprising lower and upper dished sections constituting a streamlined body affording a power plant compartment, an internal combustion engine disposed in said compartment, said engine being secured to one of said sections and including a cylinder head disposed in opposition to and in spaced relation with the nose portions of said sections, the cylinder head and the nose portions of said sections defining a chamber from which rearward movement of air past one side of the cylinder is substantially prevented and from which rearward movement of air past the other side of the cylinder is freely permitted, the nose portion of the body being provided with an opening through which air may enter said chamber to impinge upon the cylinder head in an area adjacent that side of the cylinder past which rearward movement of air is substantially prevented, the streamlined body being provided in its rearwardly tapering portion with an outlet opening through which outward flow of air is induced by the region of low pressure air existing at and exteriorly of such outlet opening when the vehicle is traveling rapidly forwardly, the upper section of the body being provided with an opening through which the engine exhausts its products of combustion with ejector effect, and the upper body section and the upper portion of the engine cylinder defining an avenue through which air may flow rearwardly from the chamber and over the top of the cylinder to escape from the body via the opening through which the engine exhausts its products of combustion.

2. An automotive vehicle comprising upper and lower complementary dished sections constituting a streamlined body affording an engine compartment; an engine disposed in said compartment, said engine being secured to the lower body section and comprising a substantially horizontally disposed cylinder having its head spaced from and in opposed relation to the nose portions of the body sections; pillars rising from and lying within the lower body section on opposite sides of the cylinder, each of said pillars being contoured to so embrace the cylinder as to prevent substantial rearward flow of air between said pillar and the cylinder, a first of said pillars being conformed to prevent rearward flow of air between it and the adjacent side wall of the lower body section, the second of said pillars being conformed freely to permit rearward flow of air between it and the other side wall of the lower body section; pillars depending from and lying within the upper body section and having their lower ends opposed and lying immediately adjacent to the upper ends of the first-mentioned pillars, the upper body section pillar which lies opposite the aforesaid first of the lower body section pillars being conformed to prevent rearward flow of air between it and the adjacent side wall of the upper body section, the other of the upper body section pillars being conformed freely to permit rearward flow of air between it and the other side wall of the upper body section; the nose portion of the body being provided with an air inlet opening located oppositely, with respect to the medial vertical fore-and-aft plane of the body, from those pillars between which and the adjacent side walls of the body section rearward flow of air is permitted; and an air outlet opening formed in the rearwardly tapering portion of the body; whereby, when the model is traveling rapidly forwardly, air from a high pressure region existing exteriorly of the body enters the nose portion of the body through its air inlet opening to impinge upon one side portion of the cylinder head, then sweep across the cylinder head, and then pass rearwardly between the last-mentioned pillars and the adjacent side walls of the body sections to escape through the air outlet opening to a region of low pressure existing exteriorly of the body.

3. An automotive vehicle according to claim 2 wherein the air inlet opening and the air outlet opening are oppositely located with respect to the medial vertical fore-and-aft plane of the body.

4. An automotive vehicle comprising a streamlined body affording a power plant compartment, an internal combustion engine disposed in said compartment, said engine being secured in said compartment and including a cylinder head disposed in opposition to and in spaced relation with the nose portion of said body, the cylinder head and the nose portion of said body defining a chamber from which rearward movement of air past one side of the cylinder is substantially prevented and from which rearward movement of air past the other side of the cylinder is freely permitted, the nose portion of the body being provided with an opening through which air may enter said chamber to impinge upon the cylinder head in an area adjacent that side of the cylinder past which rearward movement of air is substantially prevented, the streamlined body being provided in its rearwardly tapering portion with an outlet opening through which outward flow of air is induced by the region of low pressure air existing at and exteriorly of such outlet opening when the vehicle is travelling rapidly forwardly, the upper portion of the body being provided with an opening through which the engine exhausts its products of combustion with ejector effect, and the upper portion of the body and the upper portion of the engine cylinder defining an avenue through which air may flow rearwardly from the chamber and over the top of the cylinder to escape from the body via the opening through which the engine exhausts its products of combustion.

WARREN A. BORDEN.

REFERENCES CITED

The following references are of record in the file of this patent:

UNITED STATES PATENTS

| Number | Name | Date |
|---|---|---|
| 2,393,899 | Gregory | Jan. 29, 1946 |